United States Patent
Nagashima et al.

[11] Patent Number: 6,088,454
[45] Date of Patent: Jul. 11, 2000

[54] KEY MANAGEMENT METHOD, ENCRYPTION SYSTEM, AND SHARING DIGITAL SIGNATURE SYSTEM WHICH HAVE HIERARCHIES

[75] Inventors: Takayuki Nagashima; Keiichi Iwamura, both of Yokohama, Japan

[73] Assignee: Canon Kabushiki Kaisha, Tokyo, Japan

[21] Appl. No.: 08/996,132

[22] Filed: Dec. 22, 1997

[30] Foreign Application Priority Data

Dec. 27, 1996 [JP] Japan .................. 8-351565

[51] Int. Cl.[7] .................................................. H04L 9/30
[52] U.S. Cl. .................................................. 380/49; 380/30
[58] Field of Search .................. 380/30, 49, 45; 375/286

[56] References Cited

U.S. PATENT DOCUMENTS

5,214,702  5/1993  Fischer ........................ 380/30
5,315,658  5/1994  Micali ......................... 380/30

*Primary Examiner*—Tod R. Swann
*Assistant Examiner*—Todd Jack
*Attorney, Agent, or Firm*—Fitzpatrick, Cella, Harper & Scinto

[57] ABSTRACT

A key management method, an encryption system, and a sharing digital signature system are provided, which are designed to hierarchically manage the degrees of contribution of members to a digital signature operation and the like so as to be suitably used for a group having a hierarchical structure. In an information communication system including a plurality of information processing apparatuses connected to each other through a communication line, a first member (11a) holding a secret key K and a plurality of second members (11b–11d) holding pieces of partial information $K_{1i}$ (i=1, 2, . . . ) generated by secret sharing of the secret key K are provided. The first member can use the secret key K as a key for the information communication system, but the second members can obtain a key for the information communication system only by collecting a predetermined number $t_1$ or more of pieces of partial information $K_{1i}$.

15 Claims, 9 Drawing Sheets

KEY MANAGEMENT METHOD, ENCRYPTION SYSTEM, AND SHARING DIGITAL SIGNATURE SYSTEM WHICH HAVE HIERARCHIES

BACKGROUND OF THE INVENTION

1. Field of the Invention

The present invention relates to a key management method, an encryption system, and a sharing digital signature system which perform encryption and digital signature (authentication) as group operations by using an environment having a plurality of information processing apparatuses connected to each other through a communication line.

2. Related Background Art

An encryption technique is known as a technique of ensuring the prevention of the leakage of transmitted information to receiving apparatuses other than a designated apparatus (security of information) in an information communication system including a plurality of information processing apparatuses connected to each other through a communication line. The encryption technique is also known well as a technique which is effective at realizing an authentication function of checking whether received information has been transmitted from a designated apparatus or has not been tampered in the process of transmission, and a function called a digital signature which can prove to a third party that the received information has been transmitted from the designated apparatus, in addition to the above information security function.

An authentication and digital signature scheme using the RSA encryption algorithm as one of public-key encryption schemes is especially known widely (R. Rivest, A. Shamir, L. Adleman, "A Method for Obtaining Digital Signatures and Public-Key Cryptosystem", Communications of the ACM, 21, 2, 1978, pp. 120–126). The above authentication function is normally constituted by two procedures. In one procedure, signature is performed on the transmission side to give unique information to transmission information. In the other procedure, authentication is performed on the reception side to check, on the basis of the unique information from the transmission side which has been given to the information received by the reception side, whether the information has been transmitted from the designated apparatus and has not been tampered in the process of transmission.

Figure 7:
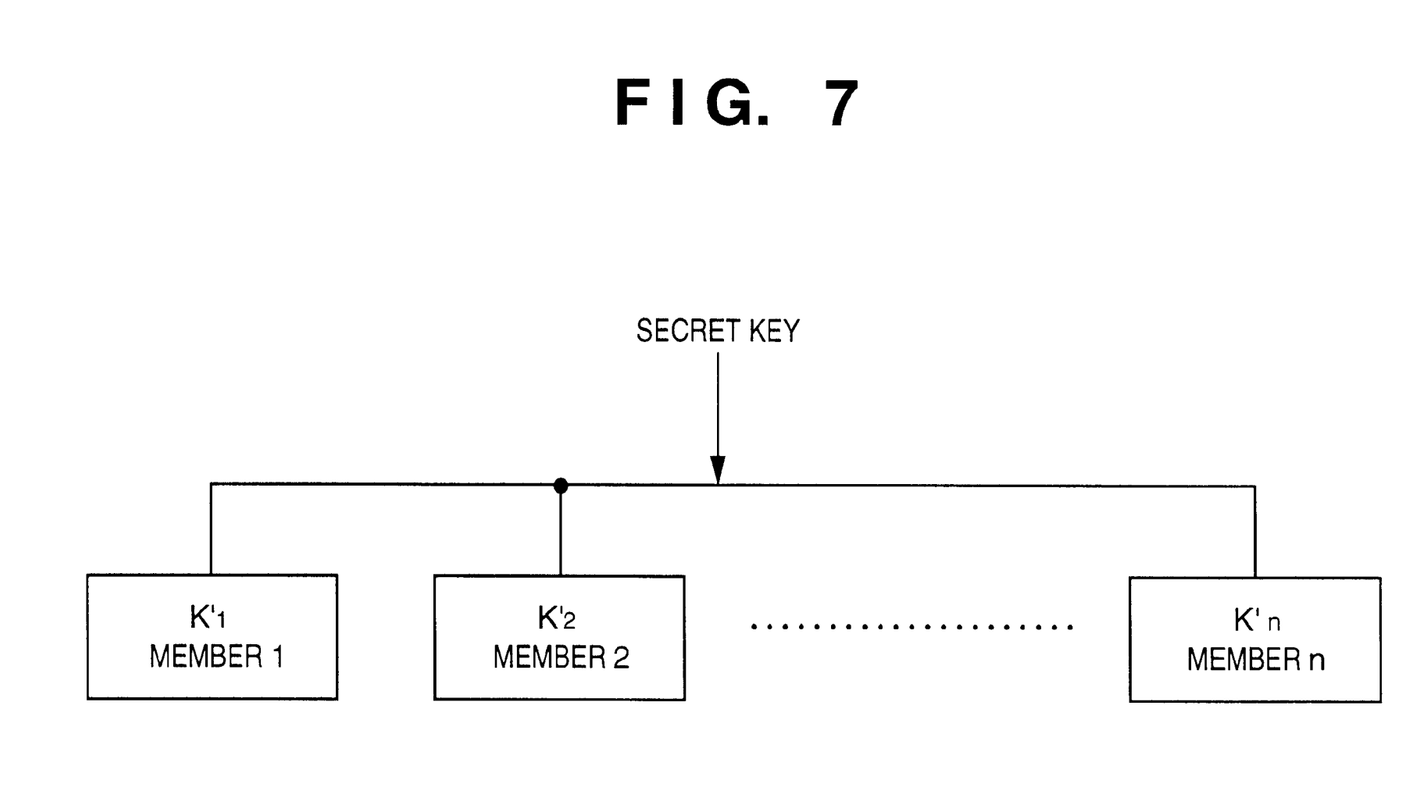
FIG. 7 is a block diagram for explaining transmission of a key in a conventional sharing authentication scheme.

A method of sharing the calculation of a digital signature for a given message among a plurality of information processing apparatuses connected to each other through a communication line in an information communication system in which security and authentication are realized in the above manner is disclosed in Yvo Desmedet, Yair Frankel ("Threshold cryptosystems", Advances in Cryptology-Crypto '89, 435, Springer-Verlag, 1990, pp. 307–315: "Shared Generation of Authenticators and Signatures", Advances in Cryptology-Crypto '91, 576, Springer-Verlag, 1992, pp. 457–469) (FIG. 7). The above plurality of information processing apparatuses will be referred to as a signatory group hereinafter, and each information processing apparatus joining the group will be referred to as a member. In addition, the number of members joining the group is represented by n.

Referring to FIG. 7, n pieces of partial information are generated from secret information (key) K. These pieces of information are secretly held by the n members. By synthesizing a predetermined number or more of pieces of information of K'i (i=1, 2, . . . , n) pieces of information held by these members, original secret information (key) K is restored, and a digital signature as a group signature can be generated. This scheme is called the sharing digital signature scheme. To generate a digital signature, secret information (key) unique to the signatory is required. Basically, the sharing digital signature scheme is a scheme of sharing secret information in an information communication system constituted by a plurality of members in the following manner.

A technique called secret sharing (SS) is used to share secret information. According to secret sharing, k pieces of partial information $X_1, X_2, \ldots, X_k$ are generated from given secret information X. To restore the secret information X, t ($t \leq k$) or more pieces of partial information are required. With less than t−1 pieces of partial information, any information associated with the secret information cannot be obtained.

In this case, the number t of pieces of partial information required to restore the secret information is called a threshold. This scheme of sharing secret information is therefore called a threshold scheme. More specifically, the threshold scheme in A. Shamir ("How to Share a Secret", Communications of the ACM, Vol 22, 11, 1979) is realized in the following manner. To secretly share one piece of information among a plurality of pieces of partial information, a polynomial f(x) of the (t−1)th order having a constant term as the above secret information is randomly selected, and values f(i) (i=1, 2, . . . , k) of the polynomial are obtained with respect to the k different values. This value f(i) becomes the above partial value Xi. Although the secret information can be restored by polynomial interpolation using t pieces of partial information, any information associated with the secret information cannot be obtained with less than t−1 pieces of partial information.

That is, the sharing digital signature scheme using the RSA encryption algorithm based on the secret sharing scheme by Y. Desmedt and T. Frankel satisfies the following conditions:

1) The cooperation of t members is sufficient to generate a digital signature for a message given to a signatory group.

2) A digital signature for a given message cannot be generated with the number of members less than a threshold (t−1).

In above conventional sharing authentication system, when a signature is to be written as a group signature, all the members belonging to the group are handled equally. Under any condition, when a digital signature for a message given to a group is to be generated, the consensus of at least a predetermined number t of members is always required. For this reason, this system is not suited for a group having a hierarchical structure associated with a system of command or ranks.

SUMMARY OF THE INVENTION

It is an object of the present invention to provide a key management method, an encryption system, and a sharing digital signature system which are designed to hierarchically manage the degrees of contribution of members to a digital signature operation and the like so as to be suitably used for a group having a hierarchical structure.

It is the first object of the present invention to realize a key management method and system which are suited to a group constituted by a representative and general members, i.e., members at two levels.

It is the second object of the present invention to realize a digital signature system suited to a group constituted by a representative and general members, i.e., members at two levels.

It is the third object of the present invention to realize an encryption system suited to a group constituted by a representative and general members, i.e., members at two levels.

It is the fourth object of the present invention to realize a key management method and system which are suited to a multilevel group constituted by members belonging to various levels.

It is the fifth object of the present invention to realize a digital signature system suited to a multilevel group constituted by members belonging to various levels.

It is the sixth object of the present invention to realize an encryption system suited to a multilevel group constituted by members belonging to various levels.

It is the seventh object of the present invention to realize a key management method and system which are suited to a multilevel group having subgroups constituted by members belonging to various levels and including no representatives.

It is the eighth object of the present invention to realize a digital signature system suited to a multilevel group having subgroups constituted by members belonging to various levels and including no representatives.

It is the ninth object of the present invention to realize an encryption system suited to a multilevel group having subgroups constituted by members belonging to various levels and including no representatives.

In order to achieve the above objects, according to the present invention, there is provided a key management method functioning in an information communication system including a plurality of information processing apparatuses connected to each other through a communication line, comprising the steps of providing at least one first member holding a secret key K and a plurality of second members secretly holding at least one piece of partial information $K_{1i}$ (i=1, 2, . . . ) generated by secret sharing of the original secret key K, and allowing the first member to use the secret key K as a key for the information communication system, and allowing the second members to obtain a key for the information communication system only by collecting not less than a predetermined number of pieces of partial information $K_{1i}$.

This method further comprises the steps of providing pluralities of third members, fourth members, . . . holding at least one piece of partial information $K_{2ij}$ (j=1, 2, . . . ), $K_{3ijm}$ (m=1, 2, . . . ), . . . generated by further performing secret sharing of the partial information, and allowing the third members, the fourth members, . . . to obtain pieces of partial information $K_{1i}$, $K_{2ij}$, . . . of members at upper levels only by collecting not less than predetermined numbers of pieces of partial information $K_{2ij}$, $K_{3ijm}$, . . . . In addition, no member holding the original secret K or at least one piece of partial information at a level other than the lowermost level is provided, and all members respectively holding pieces of partial information at the lowermost level are provided. The information communication system is either a sharing digital signature system or an encryption system.

According to the present invention, there is provided a sharing digital signature system including a plurality of information processing apparatuses connected to each other through a communication line, comprising at least one first apparatus holding a secret key K and a plurality of second apparatuses secretly holding at least one piece of partial information $K_{1i}$ (i=1, 2, . . . ) generated by secret sharing of the original secret key K, the first and second apparatuses being connected to each other through the communication line, wherein the first apparatus can perform signature alone, but the second apparatuses can perform signature only when not less than a predetermined number of apparatuses consent.

This system further comprises a pluralities of third apparatuses, fourth apparatuses, . . . secretly holding at least one piece of partial information $K_{2ij}$ (j=1, 2, . . . ), $K_{3ijm}$ (m=1, 2, . . . ), . . . generated by further performing secret sharing of the partial information, wherein each of the third apparatuses, the fourth apparatuses, . . . can contribute to an operation intended by an apparatus at a lower level only when not less than a predetermined number of apparatuses consent. In addition, no apparatus holding the original secret K or at least one piece of partial information at a level other than the lowermost level is provided, and all apparatuses respectively holding pieces of partial information at the lowermost level are provided.

According to the present invention, there is provided an encryption system including a plurality of information processing apparatuses connected to each other through a communication line, comprising at least one first apparatus holding a secret key K and a plurality of second apparatuses secretly holding at least one piece of partial information $K_{1i}$ (i=1, 2, . . . ) generated by secret sharing of the secret key K, the first and second apparatuses being connected to each other through the communication line, wherein the first apparatus can perform encryption and decryption alone, but the second apparatuses can perform encryption and decryption only by collecting not less than a predetermined number of pieces of partial information $K_{1i}$.

The system further comprises pluralities of third apparatuses, fourth apparatuses, . . . secretly holding at least one piece of partial information $K_{2ij}$ (j=1, 2, . . . ), $K_{3ijm}$ (m=1, 2, . . . ), . . . generated by further performing secret sharing of the partial information, wherein the third apparatus, the fourth apparatuses, . . . can obtain pieces of partial information $K_{1i}$, $K_{2ij}$, . . . at upper levels only by collecting not less than predetermined numbers of pieces of partial information $K_{2ij}$, $K_{3ijm}$, . . . . In addition, no apparatus holding the original secret K or at least one piece of partial information at a level other than the lowermost level is provided, and all apparatuses respectively holding pieces of partial information at the lowermost level are provided.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The embodiments of the key management method and system of the present invention will be described below with reference to the accompanying drawings.

<First Embodiment>

Figure 1:
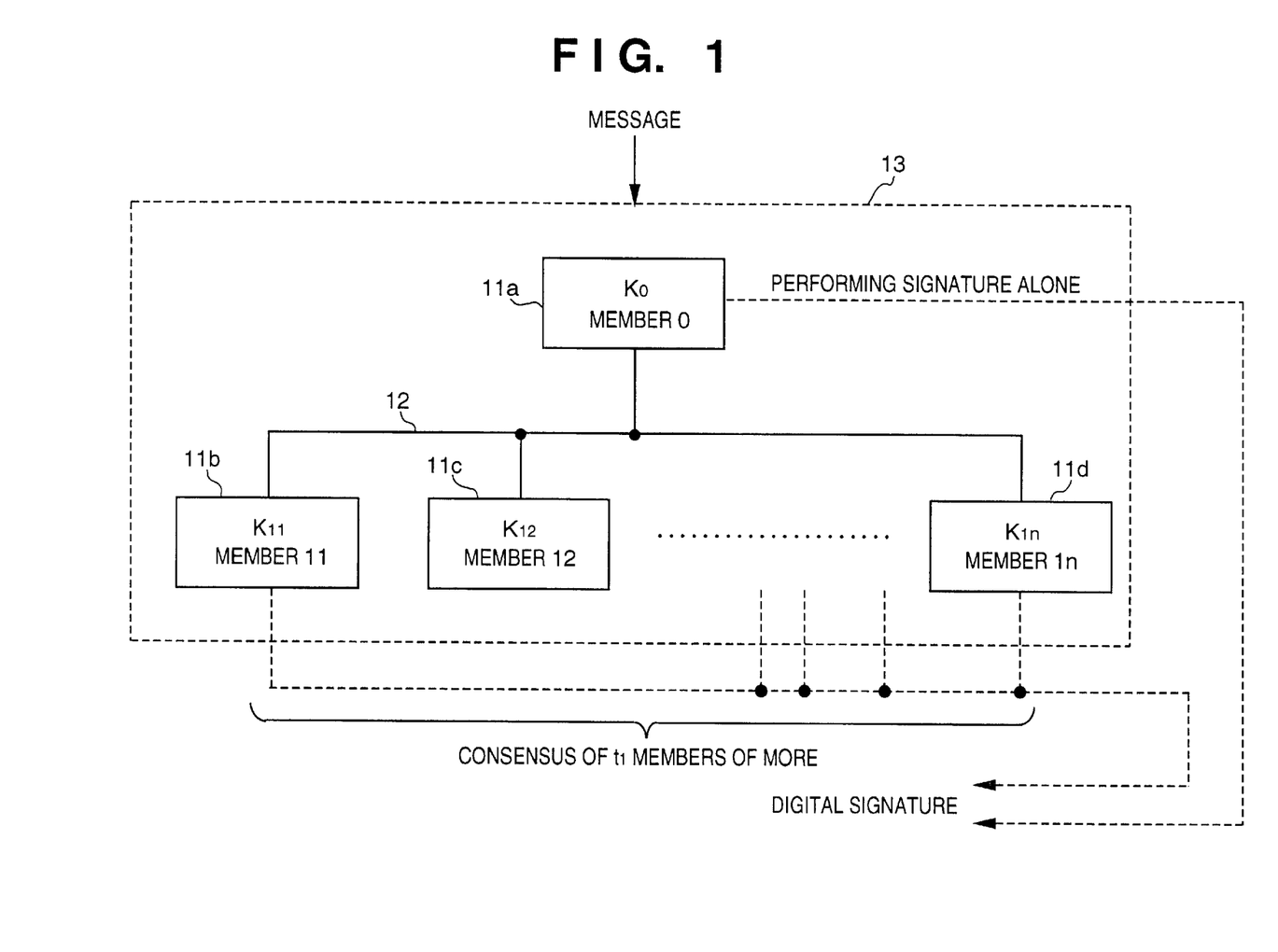
FIG. 1 is a block diagram for explaining the arrangement of a sharing digital signature system, key management, and an authentication procedure according to the first embodiment of the present invention.

FIG. 1 is a block diagram showing the arrangement of a sharing digital signature system according to the first embodiment.

Referring to FIG. 1, reference numerals $11a$ to $11d$ denote information processing apparatuses; $12$, a communication line; and $13$, a group including the information processing apparatuses $11a$ to $11d$ connected to each other through the communication line $12$. Reference symbol $K_0$ denotes an original secret key; and $K_{11}$ to $K_{1n}$, pieces of partial information generated by secret sharing. A member $0$ is the representative of the group surrounded by the dotted line, and holds an original secret key $K_0$ (a key for the group). Members $11, 12, \ldots, 1n$ are general members in the group, and respectively have the pieces of partial information $K_{11}$, $K_{12}, \ldots, K_{1n}$. These members are connected to each other through the communication line $12$.

Assume that a member belonging to the group tries to perform digital signature for the group. In this case, the member $0$ can perform signature alone for a message given to the group or held therein by using the secret key $K_0$. If, however, the member $0$ is absent or entrusts the general members with the task of deciding whether or not performing signature, the original secret key $K_0$ is calculated by polynomial interpolation (equation 1) upon collecting $t_1$ ($t_1 \leq 1n$) or more pieces of partial information of the pieces of partial information $K_{11}$ to $K_{1n}$ which are collected when $t_1$ or more members of the general members $11$ to $1n$ consent. With this operation, digital signature for the message can be performed.

If, however, the threshold determined in the above threshold scheme used to share the original secret key $K_0$ is represented by t (a polynomial of the (t-1)th order having $K_0$ as a constant term is selected in the threshold scheme), $t_1$ represents a value larger than t. In equation (1), $K_{p(i)}$ is each piece of partial information of t different pieces of partial information arbitrarily extracted from $t_1$ or more pieces of partial information $K_{1a(b)}$ (b=1, ..., $t_1$; $1 \leq a(b) \leq n$) of the pieces of partial information $K_{11}$ to $K_{1n}$, and is each piece of a partial information obtained by substituting $x_{p(i)}$ (i=1, ..., t: $1 \leq p(i) \leq n$) into the polynomial in the threshold scheme.

$$K_0 = \sum_{i=1}^{t} K_{p(i)} \cdot \prod_{j=1, j \neq i}^{t} \frac{-X_{p(i)}}{X_{p(i)} - X_{p(j)}} \quad (1)$$

This indicates that the member $0$ as the representative can set his/her intention as a group's intention, but a general member can set his/her intention as a group's intention only when a predetermined number or more of general members consent.

Referring to members hijm, ... and partial information $K_{hijm}$, of "h, i, j, m, ...", "h" represents a level; "i", a member at level $1$ higher than "hijm, ..."; "j", a member at level $2$ higher than "hijm, ..."; and m, a member at level $3$ higher than "hijm, ...". If, for example, given members are at level $2$, and the upper member with respect to these members is represented by $13$ (member $3$ at level $1$), the given members are represented by $23j$ (j=1, 2, ...), and the pieces of partial information held by the member are represented by $K_{23j}$. Lower members with respect to a member $237$ (member $7$ at lower level $2$ with respect to member $3$ at level $1$) of these members are represented by $337m$ (m=1, 2, ..., and the pieces of partial information held by these members are represented by $K_{337m}$.

<Second Embodiment>

Figure 2:
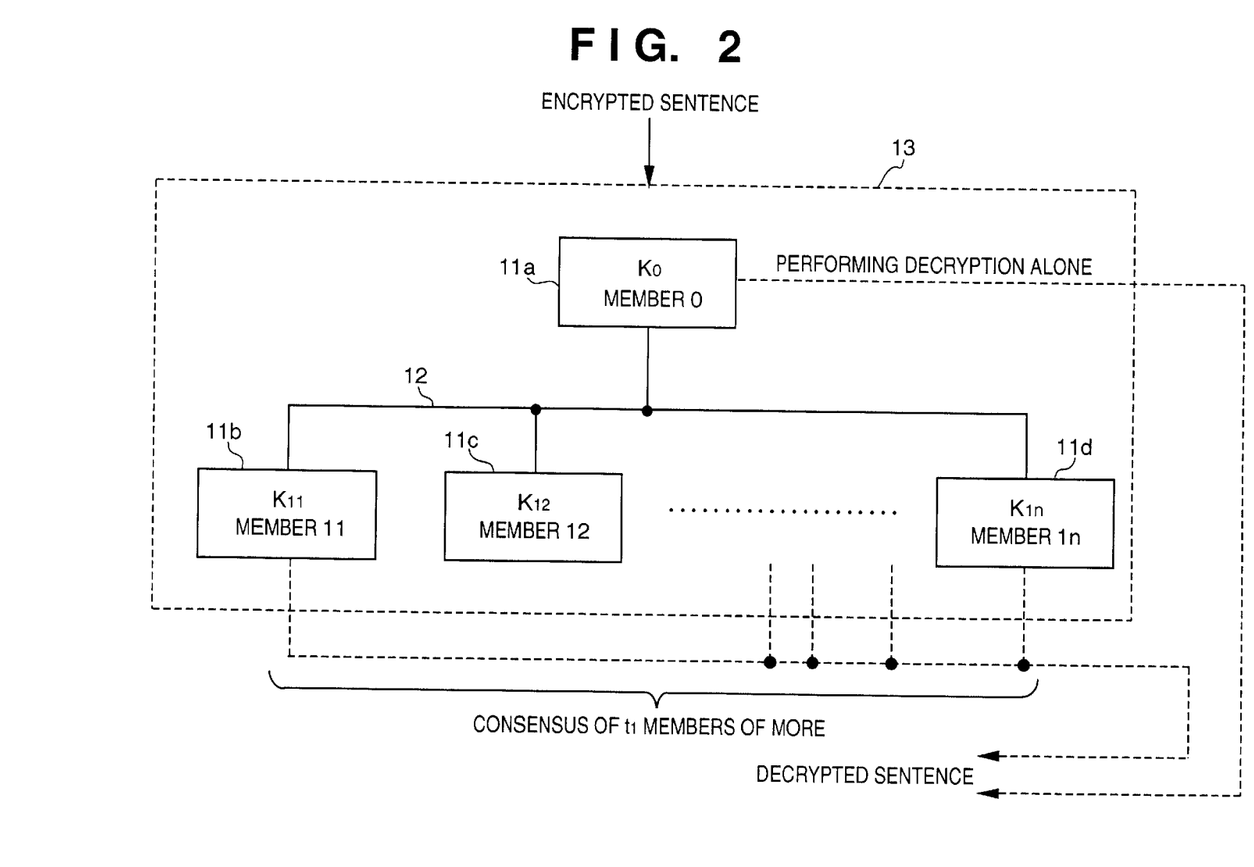
FIG. 2 is a block diagram for explaining the arrangement of an encryption system, key management, and a decrypting procedure according to the second embodiment of the present invention.

FIG. 2 shows the arrangement of an encryption system in which the secret key K in the first embodiment is a decrypting key. The second embodiment is the same as the first embodiment except that reference symbol $K_0$ denotes a decrypting key of a group; and $K_{11}, K_{12}, \ldots, K_{1n}$, pieces of partial information of the decrypting key $K_0$. The representative (member $0$) can decrypt an encrypted sentence addressed to the group or encrypted message as data held by the group by himself/herself. However, a general member $1_i$ can decrypt an encrypted sentence addressed to the group only when a predetermined number $t_1$ or more of members consent, each member then performs decrypting processing by using partial information $K_{1i}$ secretly held by each member, and the respective decrypting results are synthesized. The encrypted sentence cannot be decrypted by $t_1-1$ or less general members.

<Third Embodiment>

Figure 3:
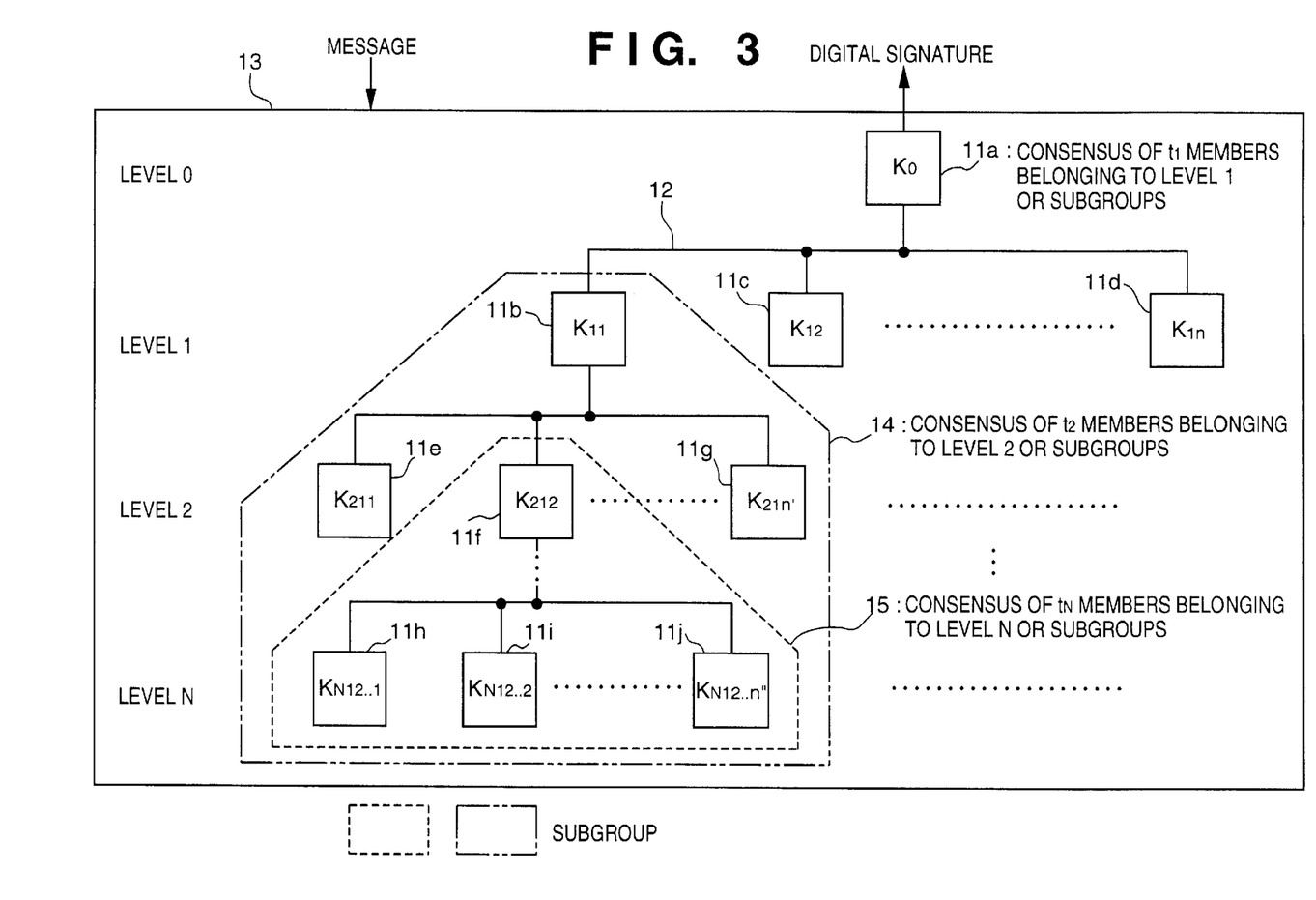
FIG. 3 is a block diagram for explaining the arrangement of a sharing digital signature system, a key management, and an authentication procedure according to the third embodiment of the present invention.

Referring to FIG. 3, reference numerals $11a$ to $11j$ denote information processing apparatuses; $12$, a communication line; $13$, a group including the information processing apparatuses $11a$ to $11j$ connected to each other through the communication line $12$; $14$ and $15$, subgroups each including a plurality of information processing apparatus in the group, respectively.

Reference symbol $K_0$ denotes an original secret key (signature key) held by the representative (member $0$) of the group as a signature key for the group; $K_{11}$ to $K_{1n}$, pieces of partial information generated by secret sharing of the secret key $K_0$ and respectively held by members (members $11$, $12, \ldots, 1n$) lower than the member $0$; $K_{211}, K_{212}, \ldots, K_{21n'}$, pieces of partial information generated by secret sharing of the partial information $K_{11}$ and respectively held by members (members $211, 212, \ldots, 21n'$) lower than the member $11$; and $K_{N12\ldots 1}, \ldots, K_{N12\ldots n''}$, pieces of partial information obtained by performing secret sharing of the partial information $K_{212}$ q times (q>0) and respectively held by members (members N12 ... 1, ..., N12 ... n") lower than the member $212$ by q levels.

In this case, a group like the one in the first embodiment is set for lower members in a recursive manner to make the group in the first embodiment have a multilevel structure. Assume that the level to which the member $0$ belongs is level 0, and the levels to which the members 1*i* (i=1, 2, ...) are levels 1, .... A given member can perform digital signature, as group signature, for a message given to the group or held therein under the following conditions:

1) The member 0 can perform signature alone.
2) Each of the members 11, 12, ..., 1*n* can perform signature if a predetermined number $t_1$ or more of members consent.
3) If the member 11 is absent or entrusts the lower members 211, 212, ..., 21*j* with the task of deciding whether or not performing signature, a lower member can join group signature as a substitute for the member 11 only when a predetermined number $t_{21}$ or more of members of the members 211, 212, ..., 21*j* consent. Even if, however, all the members 211, 212, ..., 21*j* consent, group signature cannot be performed unless the sum of the substitute and members of the members 12, ..., 1*n* at level 1 who consent becomes $t_1$ or more.
4) A member of a subgroup at a lower level can join signature as a substitute for the representative of the subgroup (e.g., in the subgroup constituted by the member 212 and lower members in FIG. 3, the member 212 is the representative of the subgroup) when a predetermined number of members of the subgroup consent.

<Fourth Embodiment>

Figure 4:
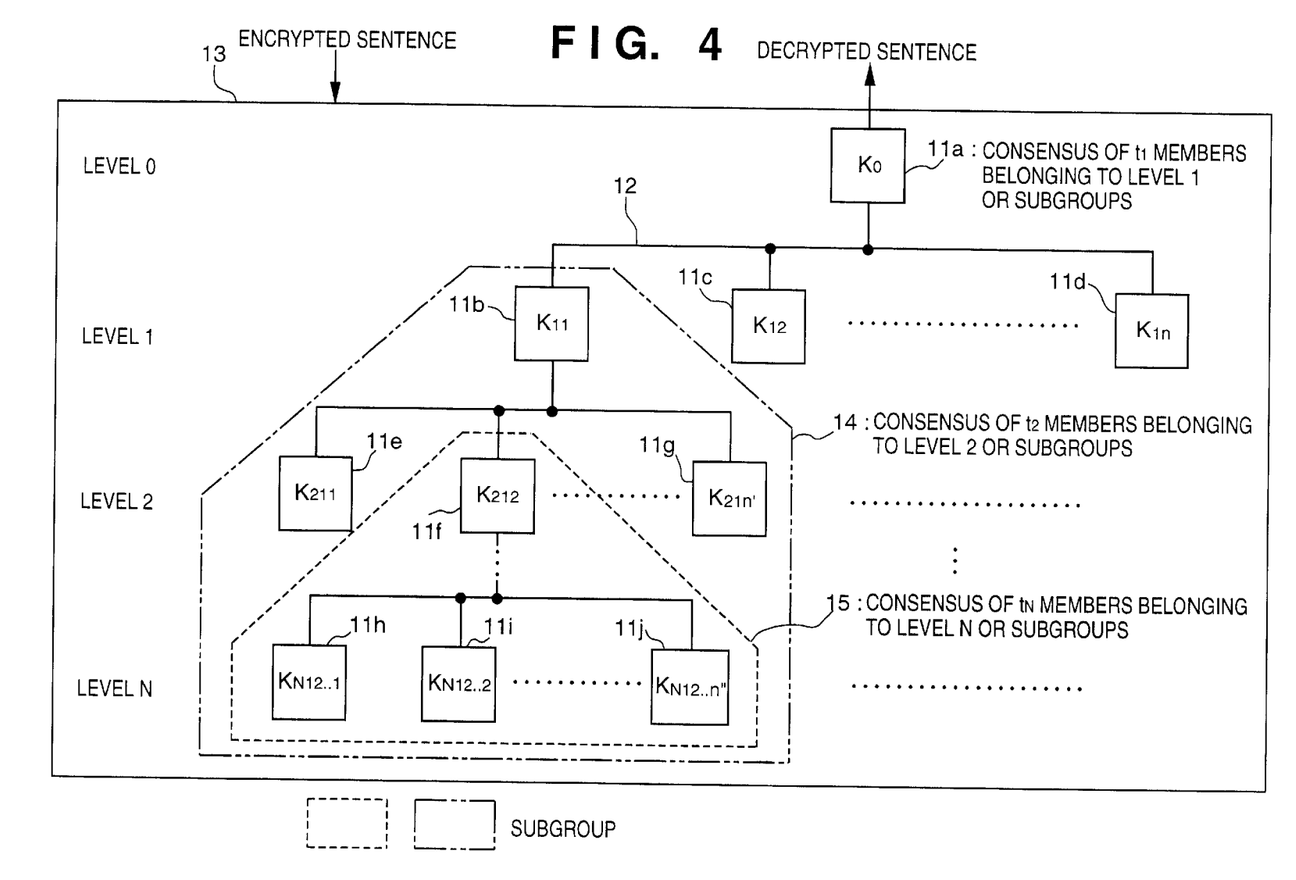
FIG. 4 is a block diagram for explaining the arrangement of an encryption system, key management, and a decrypting procedure according to the fourth embodiment of the present invention.

FIG. 4 shows the same arrangement as that of the third embodiment except that the original secret key $K_0$ in the third embodiment is a decrypting key for encrypted data, the pieces of partial information $K_{11}, K_{12}, ..., K_{1n}$ are pieces of partial information of the decrypting key $K_0$, and the pieces of partial information $K_{211}, K_{212}, ..., K_{21j}$ are pieces of partial information of the partial information $K_{11}$ of the decrypting key $K_0$. A given member of this group can decrypt an encrypted sentence addressed to the group or held therein under the following conditions:

1) A member 0 can decrypt the encrypted sentence alone.
2) If a predetermined number $t_1$ or more of members of members 11, 12, ..., 1*n* consent, decrypting can be performed.
3) If the member 11 is absent or entrusts lower members 211, 212, ..., 21*j* with the task of deciding whether or not performing decrypting, a lower member can join a decrypting operation as a substitute for the member 11 only when a predetermined number $t_{21}$ or more of members of the members 211, 212, ..., 21*j* consent. Even if, however, all the members 211, 212, ..., 21*j* consent, decrypting cannot be performed as a group operation unless the sum of the substitute and members of the members 12, ..., 1*n* at level 1 who consent becomes $t_1$ or more.
4) A member of a subgroup at a lower level can join the decrypting operation as a substitute for the representative of the subgroup when a predetermined number of members of the subgroup consent.

<Fifth Embodiment>

Figure 5:
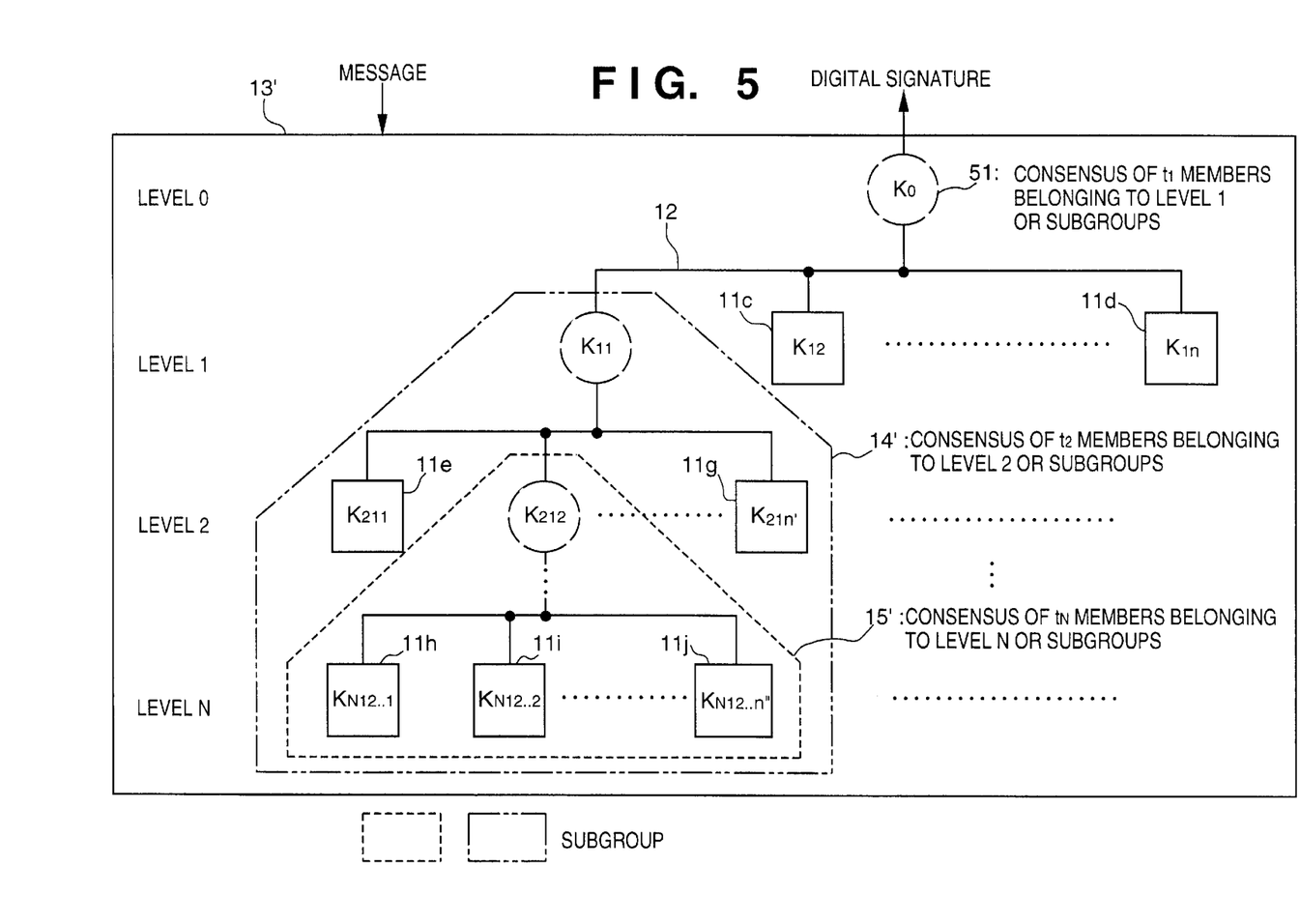
FIG. 5 is a block diagram for explaining the arrangement of a sharing digital signature system, a key management, and an authentication procedure according to the fifth embodiment of the present invention.

Referring to FIG. 5, reference numeral 51 denotes an information processing apparatus which may not exist. Except for this, the fifth embodiment is the same as the third embodiment. With this arrangement, the third embodiment can be applied to a group 13' having no representative or a group including a subgroup 14' having no representative.

If, for example, the member 0 as the representative of the group does not exist, a final decision on group signature is always made by making a predetermined number or more of members of the members belonging to level 1 or subgroups consent. If the member 11 does not exist, a final decision is made by making a predetermined number or more of members of the members belonging to level 2 or subgroups consent.

<Sixth Embodiment>

Figure 6:
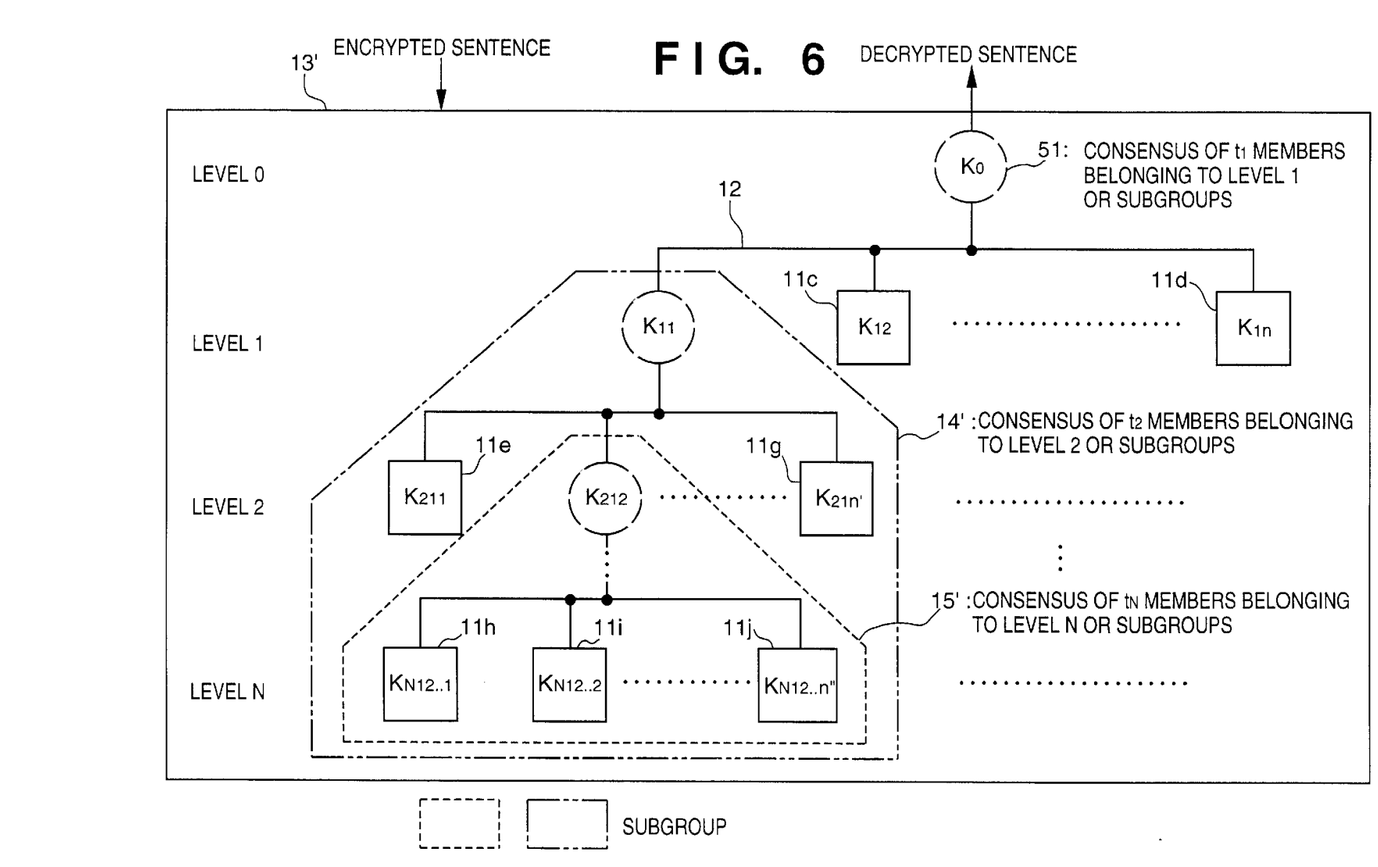
FIG. 6 is a block diagram for explaining the arrangement of an encryption system, key management, and a decrypting procedure according to the sixth embodiment of the present invention.

FIG. 6 shows an arrangement for a case in which the secret key $K_0$ in the fifth embodiment is a decrypting key in an encryption system. The sixth embodiment has the same arrangement as that the fifth embodiment except that the secret key $K_0$ is a group decrypting key, the pieces of partial information $K_{11}, K_{12}, ...$ are pieces of partial information of the decrypting key $K_0$, and the pieces of partial information $K_{211}, K_{212}, ...$ are pieces of partial information of the partial information $K_{11}$. With this arrangement, the fourth embodiment can be applied to a group 13' having no representative or a group including a subgroup 14' having no representative.

If, for example, the member 0 as the representative of the group does not exist, a final decision on a decrypting operation for an encrypted sentence of the group is always made by making a predetermined number of more of members of the members belonging to level 1 or subgroups consent. If the member 11 does not exist, a final decision is made by making a predetermined number or more of members of the members belonging to level 2 or subgroups consent.

<Arrangement of Information Processing Apparatus in Embodiments of Present Invention>

Figure 8:
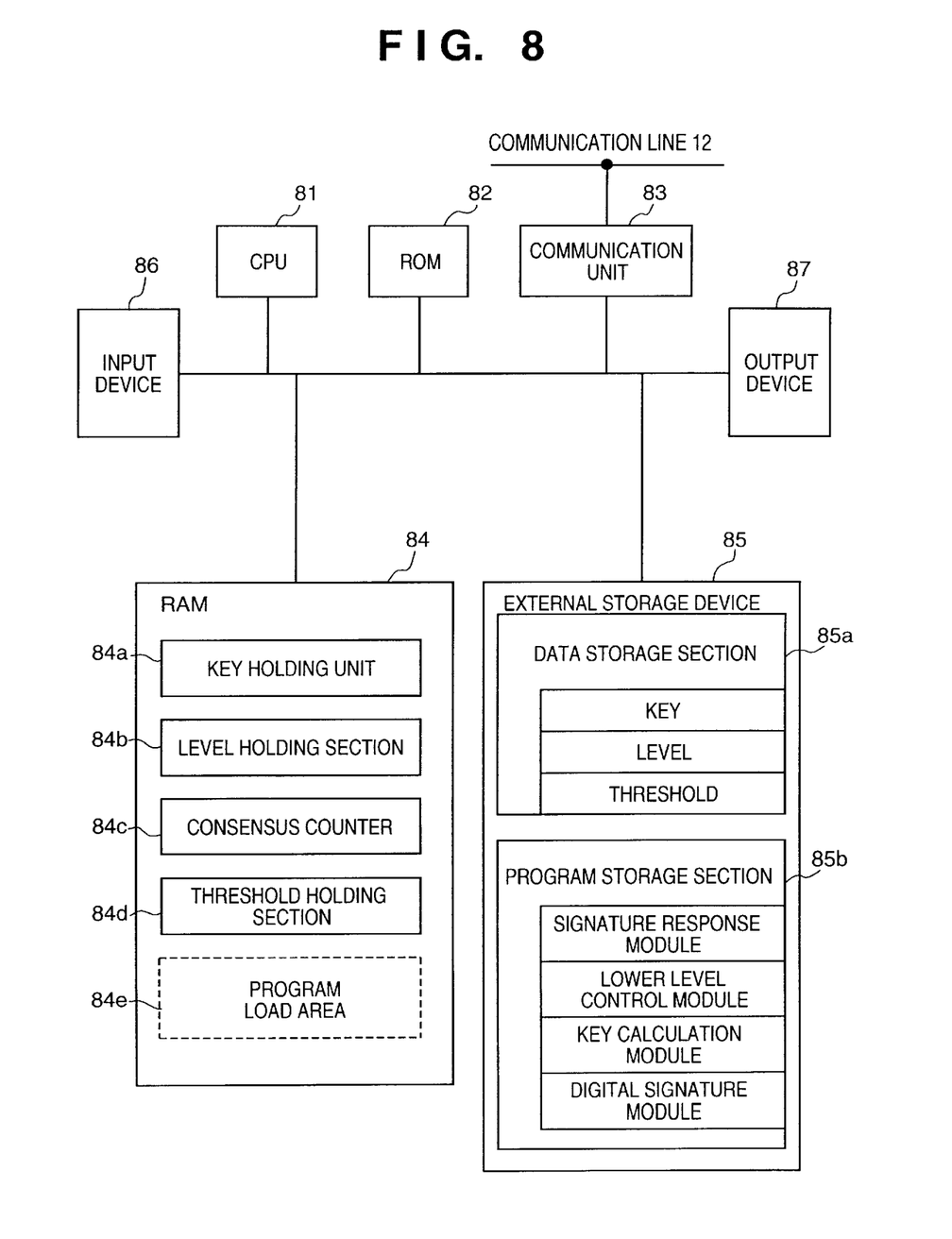
FIG. 8 is a block diagram showing an arrangement of an information processing apparatus which implements the processing in each embodiment.

FIG. 8 is a block diagram showing an arrangement of an information processing apparatus according to the embodiments, which implements the key management method, encryption system, and sharing digital signature system of the present invention. Note that the information processing apparatus in FIG. 8 is preferably implemented by a general personal computer, in which programs and data for implementing the present invention are loaded and executed, thereby implementing the functions of the present invention. The following description is associated with sharing digital signature. As is obvious to those skilled in the art, this arrangement applies to decryption and the like.

Referring to FIG. 8, reference numeral 81 denotes a CPU, i.e., a central processing unit, which controls the overall information processing apparatus and performs arithmetic processing, and the like; 82, a ROM, i.e., a read-only memory, which serves as a storage area for a system start program, fixed information, and the like; and 83, a communication unit for communicating with other information processing apparatuses through an external communication line 12.

Reference numeral 84 denotes a RAM, i.e., a random access memory, which serves as a data storage area on which no limitations of use are imposed. In this area, various programs and data represented by the flow chart to be described later are loaded and executed for various types of processing. For example, the RAM 84 includes a key holding section 84*a* for storing sharing keys (at level 0, a secret key), a level holding section 84*b* for storing level information which specifies the level at which the apparatus is operating, a consensus counter 84*c* for storing a consensus count of digital signature from a lower level in the apparatus, a threshold holding section 84*d* for holding a threshold (t, $t_1$, or the like in the above description) for checking, upon comparison with the consensus counter 84*c*, whether a consensus has been reached at a lower level, and a program load area 84*e* for loading programs from an external storage device 85 such as an HD, an FD, or the like. If fixed values are to be held in the apparatus, the values may be stored in the ROM 82.

Reference numeral 85 denotes an external storage device such as a floppy disk, a hard disk, a CD-ROM, or the like, in which programs and data are stored to be referred to or loaded into the RAM 84 and executed as needed. The external storage device 85 may be used in place of the RAM 84 to temporarily store data. The external storage device 85 includes a data storage section 85a for, as data, storing a sharing key (at level 0, a secret key), level data, a threshold, and the like used in this case, and a program storage section 85b for storing, as programs to be loaded into the RAM 84 and executed, a signature response module for controlling a response to a digital signature request notification from an upper level, a lower level control module for controlling a notification and a response to a lower level, a key calculation module for regenerating a secret key (or a sharing key) from sharing keys according to equation (1), a digital signature module for performing digital signature on the basis of the calculated secret key, and the like, in addition to an OS. In this case, an FD, an HD, a CD-ROM, an MO, and the like are generally referred to as external storage devices.

Note that the digital signature module is used only by the apparatus at level 0, but the signature response module is not used by the apparatus at level 0. The respective sharing keys, the key calculation module, and the like are preferably encrypted.

Reference numeral 86 denotes an input device such as a keyboard or a mouse; and 87, an output device such as a display unit, e.g., an LCD, or a printer.

<Operation of Information Processing Apparatus in Embodiments>

Figure 9:
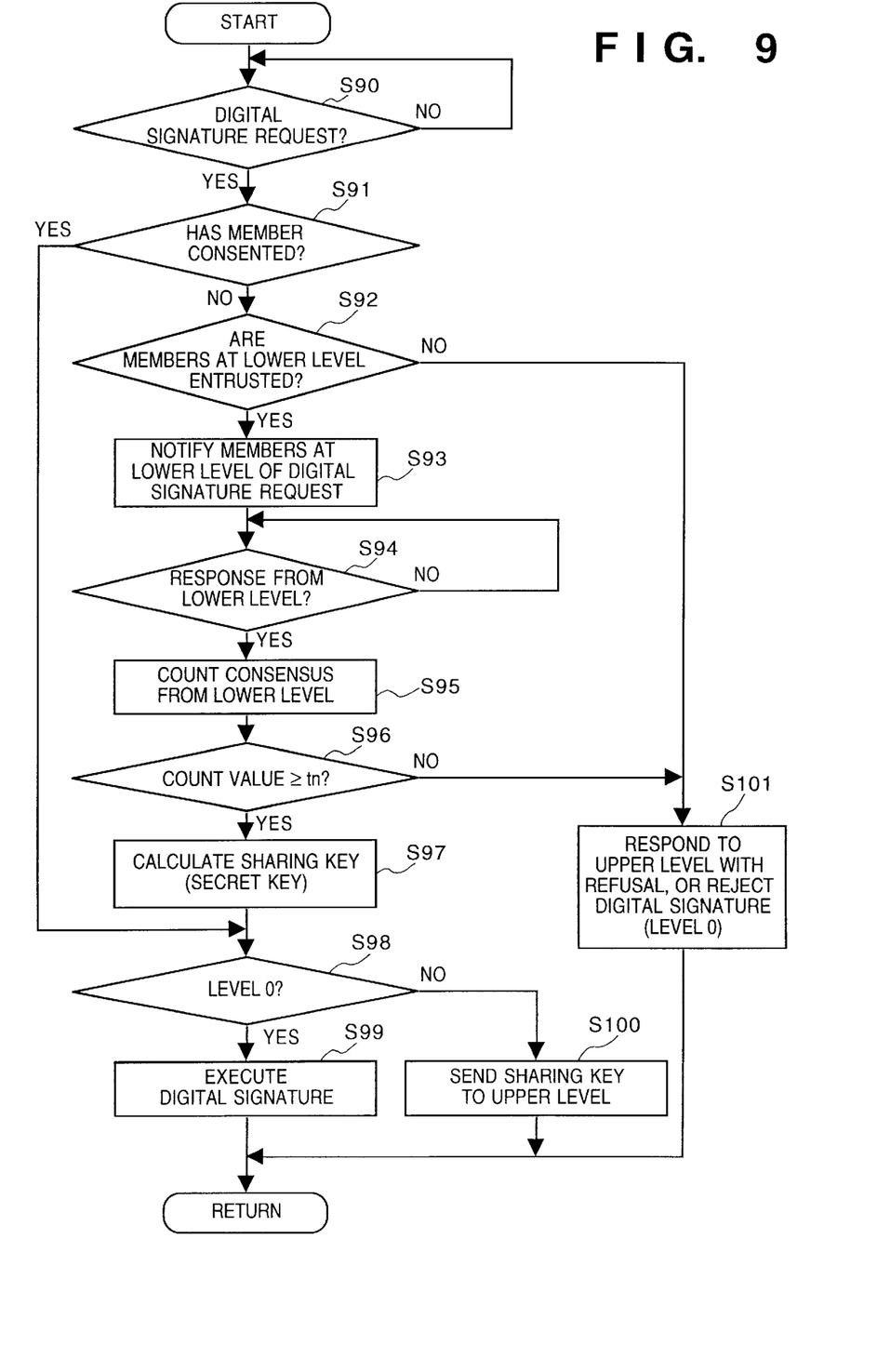
FIG. 9 is a flow chart showing an operation of the information processing apparatus.

FIG. 9 is a flow chart schematically showing a procedure for processing performed by the information processing apparatus in the embodiments.

In step S90, it is checked whether a digital signature request is sent from an apparatus at an upper level, or it is checked in the apparatus at the uppermost level (level 0) whether a digital signature request is sent from a member. If YES in step S90, it is checked in step S91 whether the member has consented. If YES in step S91, the flow advances to step S98. If NO in step S91, the flow advances to step S92 to check whether to entrust the members at a lower level with the task of making a decision. If NO in step S92, the flow advances to step S101 to respond to the upper level with refusal. In the case of level 0, digital signature is rejected.

If YES in step S92, the flow advances to step S93 to notify the members at the lower level of a digital signature request. In this case, if no representative is present as in the cases shown in FIGS. 5 and 6, not only the members at the lower level but also the members at the further lower level are notified. When a response is sent from the lower level in step S94, the number of consensuses is counted in step S95. If there is no representative at the lower level, the consensus of members at the further lower level is counted. If the count value is equal to or larger than a threshold, the consensus count at the lower level is incremented by one.

In step S96, it is checked whether the count value of consensus at the lower level is equal to or larger than a threshold $t_n$. If NO in step S96, the flow advances to step S101 to respond to the upper layer with refusal. In the case of level 0, digital signature is rejected.

If YES in step S96, the flow advances to step S97 to calculate sharing keys (a secret key in the case of level 0) from sharing keys at the lower level according to equation (1). If there is no representative at the lower level, sharing keys at the lower level are regenerated from sharing keys at the further lower level, and sharing keys (or a secret key) are calculated by using the regenerated sharing keys. Thereafter, it is checked in step S98 whether the self-apparatus is at level 0. If NO in step S98, the flow advances to step S100 to respond to the upper level with consensus, and transfer the sharing keys. In the case of level 0, digital signature is executed by using the secret key in step S99.

In the above arrangement of the information processing apparatus and the above example of processing, the upper layers control the lower layers in one direction. However, information processing apparatuses may communicate with each other regardless of levels so that they recognize the levels from the information communicated to each other, and independently operate. If no limitation is to be imposed on the movement of a key within a group, an apparatus which requests signature for a message or is requested to perform signature for the message may manage a response in the group.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the above storage medium is to be applied to the present invention, program codes corresponding to the above processing are stored in the storage medium.

As described above, according to the present invention, a key management method, an encryption system, and a sharing digital signature system, each having a hierarchical structure and suited for a group constituted by a representative and general members, can be provided.

More specifically, in an encryption system using a key having undergone secret sharing, since a member (upper member) holding a key K itself, which is subjected to secret sharing, and members holding pieces of partial information $K'_i$ (i=1, 2, . . . , n) are provided, either the key K or information K' (=K) obtained by synthesizing a predetermined number $t_1$ or more of pieces of partial information $K'_i$ can be used as a group key.

In an encryption system and a sharing digital signature system, since a secret key (signature key) is managed by the key management system of the present invention, and two levels, i.e., one level at which the upper member can perform signature alone and the other level at which any lower member cannot perform signature unless a predetermined number of members consent, are set, both digital signature to be performed by the representative (the member holding the original secret key) of the group and digital signature to be performed by a predetermined number t or more of members belonging to the group can be realized.

In addition to the member holding the key $K_0$ and the members holding the pieces of partial information $K_{1i}$, members holding the pieces of partial information $K_{2ij}$ (j=1, 2, . . . ), $K_{3ijm}$ (m=1, 2, . . . ), . . . obtained by performing secret sharing of the partial information $K_{1i}$ at least once are provided. By synthesizing a predetermined number or more of pieces of partial information, therefore, partial information as the source of the pieces of partial information or the original key can be obtained. Assume that in a group having a plurality of levels, the uppermost level is level 0, and the next uppermost layer is level 1, . . . . In this case, an original secret key is assigned to level 0, pieces of partial information generated by secret sharing of the original key are assigned to level 1, and pieces of partial information generated by secret sharing of the partial information at level 1 are assigned to level 2. In this manner, more fragmentary pieces of partial information are assigned to lower levels. In this case, arbitrary partial information belonging to level n can be obtained by synthesizing a predetermined number $t_{n+1}$ or more of pieces of partial information of the pieces of partial information belonging to level n+1 which are generated by secret sharing of the arbitrary partial information.

In an encryption system and a sharing digital signature system, when a secret key (signature key) is managed by the above key management system to realize a multilevel structure, the representative (holding the original secret key) of a group can perform encryption/decrypting or digital signature alone, and a predetermined number t or more of general members (holding pieces of partial information of the secret key) can substitute for the representative to perform encryption/decrypting or digital signature. In addition, a predetermined number $t_{n+1}$ or more of general members belonging to a subgroup at level n (or a group constituted by a representative holding given partial information and members holding pieces of partial information generated by secret sharing of the given partial information) can substitute for the representative of the subgroup (one of the general members of a group at an upper level or the subgroup) to join encryption/decrypting or signature. .

In a key management method, an encryption system, and a sharing digital signature system, by providing no member who holds at least one of pieces of partial information, other than pieces of partial information generated by final secret sharing, a subgroup having no member who holds given partial information (original key or partial information as the source of pieces of partial information) is provided. In this subgroup, the function of partial information can be realized only by synthesizing a predetermined number or more of pieces of partial information belonging to a lower level.

As has been described above, according to the present invention, there is provided a sharing signature system or an encryption system in which, in a group constituted by a plurality of members, the degrees of attribution to a signature or encrypted sentence decrypting operation, which are to be assigned to the respective members, can be hierarchically classified/managed in accordance with the ranks of the members in the group. According to this scheme, signature or decrypting can be performed when a predetermined number t or more of members consent, as in the conventional sharing authentication system. In addition, according to this sharing authentication system, a specific member can perform signature or decrypting alone, and a given member can substitute for a specific member when a predetermined number $t_N$ or more of members consent. This system is therefore more suitable for the operation of an organization.

As many apparently widely different embodiments of the present invention can be made without departing from the spirit and scope thereof, it is to be understood that the invention is not limited to the specific embodiments thereof except as defined in the appended claims.

What is claimed is:

1. A key management method in an information communication system including a plurality of information processing apparatuses connected to each other through a communication line, comprising the steps of:

providing a first member holding a secret key K and a plurality of second members holding pieces of partial information $K_{1i}$ (i=1, 2, . . . ) generated by secret sharing of the secret key K; and     allowing the first member to use the secret key K held by the first member as a key for said information communication system, and allowing the second members to obtain a key for said information communication system only by collecting not less than a predetermined number of pieces of partial information $K_{1i}$.

2. The method according to claim 1, further comprising the steps of:

providing pluralities of third members, fourth members, . . . holding pieces of partial information $K_{2ij}$ (j=1, 2, . . . ), $K_{3ijm}$ (m=1, 2, . . . ), . . . generated by further performing secret sharing of the partial information; and     allowing the third members, the fourth members, . . . to obtain pieces of partial information $K_{1i}$, $K_{2ij}$, . . . of members at upper levels only by collecting not less than predetermined numbers of pieces of partial information $K_{2ij}$, $K_{3ijm}'$, . . . from the respective members.

3. The method according to claim 1, wherein no member holding the secret K or partial information is provided at a level other than a lowermost level, and     only the secret key K or the partial information obtained by collecting not less than a predetermined number of pieces of partial information at a lower level is used.

4. The method according to claim 1, wherein said information communication system includes a sharing digital signature system or an encryption system.

5. A sharing digital signature system including a plurality of information processing apparatuses connected to each other through a communication line, comprising:

a first apparatus holding a secret key K and a plurality of second apparatuses holding pieces of partial information $K_{1i}$ (i=1, 2, . . . ) generated by secret sharing of the secret key K, said first and second apparatuses being connected to each other through the communication line,     wherein digital signature can be performed when said first apparatus consents alone or not less than a predetermined number of second apparatuses consent.

6. The system according to claim 5, further comprising pluralities of third apparatuses, fourth apparatuses, . . . holding pieces of partial information $K_{2ij}$ (j=1, 2, . . . ), $K_{3ijm}$ (m=1, 2, . . . ), . . . generated by further performing secret sharing of the partial information,     wherein each of said third apparatuses, said fourth apparatuses, . . . can contribute to an operation intended by an apparatus at a upper level only when not less than a predetermined number of members consent.

7. The system according to claim 5, wherein no apparatus holding the secret key K or partial information at a level other than a lowermost level is provided, and only the secret key K or partial information obtained by collecting not less than a predetermined number of pieces of partial information at a lower level is used.

8. An encryption system including a plurality of information processing apparatuses connected to each other through a communication line, comprising:

a first apparatus holding a secret key K and a plurality of second apparatuses holding pieces of partial information $K_{1i}$ (i=1, 2, ...) generated by secret sharing of the secret key K, said first and second apparatuses being connected to each other through the communication line, wherein encryption and decryption can be performed by said first apparatus alone by using the secret key K or by collecting not less than a predetermined number of pieces of partial information $K_{1i}$ of said second apparatuses and regenerating a secret key.

9. The system according to claim 8, further comprising pluralities of third apparatuses, fourth apparatuses, ... holding pieces of partial information $K_{2ij}$ (j=1, 2, ...), $K_{3ijm}$ (m=1, 2, ...), ... generated by further performing secret sharing of the partial information, wherein said third apparatus, said fourth apparatuses, ... can obtain pieces of partial information $K_{1i}$, $K_{2ij}$, ... at upper levels by collecting not less than predetermined numbers of pieces of partial information $K_{2ij}$, $K_{3ijm}$, ... from the respective members.

10. The system according to claim 9, wherein no apparatus holding the secret key K or partial information at a level other than a lowermost level is provided, and only the secret key K or partial information obtained by collecting not less than a predetermined number of pieces of partial information at a lower level is used.

11. A key management method in an information communication system including a plurality of members, comprising the steps of:

classifying the plurality of members into members at a plurality of levels;

performing secret sharing of a key to be held by a member at an upper level to make members at a lower level hold sharing keys; and allowing regeneration of the key at the upper level when the sharing keys held by not less than a predetermined number of members of the members at the lower level are collected.

12. The method according to claim 11, wherein no member exist at the upper level.

13. A storage medium storing a computer-readable program for implementing key management on an information communication system including a plurality of members, said program including at least:

a lower level control module for receiving sharing keys from members at a lower level and checking whether the number of sharing keys received is not less than a predetermined number; and a key calculation module for, when the number of sharing keys received becomes not less than the predetermined number, regenerating a key at an upper level from the sharing keys.

14. The storage medium according to claim 13, further comprising a key transmission module for transmitting the regenerated key to the upper level.

15. The storage medium according to claim 14, further comprising the upper level, sharing keys, and a key calculation expression.

\* \* \* \* \*

UNITED STATES PATENT AND TRADEMARK OFFICE
CERTIFICATE OF CORRECTION

PATENT NO. : 6,088,454

DATED : July 11, 2000

INVENTOR(S): TAKAYUKI NAGASHIMA, ET AL.

It is certified that error appears in the above-identified patent and that said Letters Patent is hereby corrected as shown below:

COLUMN 4
  Line 4, "a" should be deleted.
  Line 34, "apparatus," should read --apparatuses--.

COLUMN 8
  Line 5, "that the" should read --that of the--.

Signed and Sealed this

Tenth Day of April, 2001

Attest:

NICHOLAS P. GODICI

Attesting Officer    Acting Director of the United States Patent and Trademark Office